United States Patent
Yoo et al.

(10) Patent No.: US 8,331,516 B2
(45) Date of Patent: Dec. 11, 2012

(54) METHOD AND APPARATUS FOR TRANSMITTING AND RECEIVING UPLINK BANDWIDTH REQUEST INFORMATION IN WIRELESS COMMUNICATION SYSTEM

(75) Inventors: Hwasun Yoo, Suwon-si (KR); Heewon Kang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 467 days.

(21) Appl. No.: 12/561,726

(22) Filed: Sep. 17, 2009

(65) Prior Publication Data

US 2010/0322329 A1 Dec. 23, 2010

Related U.S. Application Data

(60) Provisional application No. 61/218,614, filed on Jun. 19, 2009, provisional application No. 61/223,274, filed on Jul. 6, 2009, provisional application No. 61/225,365, filed on Jul. 14, 2009.

(51) Int. Cl.
 *H04L 27/28* (2006.01)
(52) U.S. Cl. ........................................ 375/360
(58) Field of Classification Search .................. 370/260, 370/130, 259, 264, 346, 329, 203, 330, 335, 370/479

See application file for complete search history.

(56) References Cited

U.S. PATENT DOCUMENTS

| | | | |
|---|---|---|---|
| 7,804,799 B2 * | 9/2010 | Venkatachalam et al. | 370/329 |
| 2007/0274265 A1 | 11/2007 | Yoon et al. | |
| 2008/0232330 A1 | 9/2008 | Lee et al. | |
| 2010/0067467 A1 * | 3/2010 | Cho et al. | 370/329 |

FOREIGN PATENT DOCUMENTS

| | | |
|---|---|---|
| WO | WO 2007/149729 | 12/2007 |
| WO | WO 2008/082908 | 7/2008 |
| WO | WO 2009/054598 | 4/2009 |
| WO | WO 2009/066884 | 5/2009 |

OTHER PUBLICATIONS

Zhu et al., Proposed Text Changes to the IEEE 802.16m SDD (802.16m-08/003r6), Section 11.9.2.5 on the Bandwidth Request Channel, IEEE C802.16m-09/0151.

IEEE 802.16 Broadband Wireless Access Working Group, Jan. 5, 2009.

* cited by examiner

*Primary Examiner* — Khai Tran

(74) *Attorney, Agent, or Firm* — The Farrell Law Firm, P.C.

(57) ABSTRACT

Methods and apparatus are provided for requesting uplink Bandwidth (BW) over a BW Request (REQ) channel in an Orthogonal Frequency Division Multiple Access (OFDMA) communication system. A BW REQ indicator is transmitted with a BW REQ message over the BW REQ channel from a Mobile Station (MS) to a Base Station (BS) to request an uplink resource for uplink traffic of a delay sensitive service. A grant of the requested uplink resource is received from the BS in accordance with the transmitted BW REQ indicator and the BW REQ message. The uplink traffic is transmitted from the MS to the BS using the granted uplink resource.

28 Claims, 4 Drawing Sheets

METHOD AND APPARATUS FOR TRANSMITTING AND RECEIVING UPLINK BANDWIDTH REQUEST INFORMATION IN WIRELESS COMMUNICATION SYSTEM

PRIORITY

This application claims priority under 35 U.S.C. §119(e) to provisional applications filed in the U.S. Patent and Trademark Office on Jun. 19, 2009, Jul. 6, 2009, and Jul. 14, 2009 and assigned Ser. Nos. 61/218,614, 61/223,274, and 61/225,365, respectively, the contents of which are incorporated herein by reference.

BACKGROUND OF THE INVENTION

1. Field of the Invention

The present invention relates generally to a Bandwidth (BW) Request (REQ) channel in an Orthogonal Frequency Division Multiple Access (OFDMA) communication system, and more particularly, to transmission, reception and modulation methods of a BW REQ channel used by a Mobile Station (MS) to request an uplink BW from a Base Station (BS).

2. Description of the Related Art

Conventional OFDMA systems utilize a multiple access scheme in which the BS schedules and allocates time/frequency/space resources to multiple MSs using a scheduler. When using the multiple access scheme, it is necessary for the BS scheduler to strictly manage the resources in order to prevent a collision of resources in the OFDMA channel. When an MS generates uplink traffic for transmission to the BS, the MS is first required to request that the BS allocate bandwidth resources for the transmission of the uplink traffic. When an MS has not yet been allocated an uplink resource when a request is required to be made, a resource that is accessible by every MS is typically used to request the uplink bandwidth.

Figure 1:
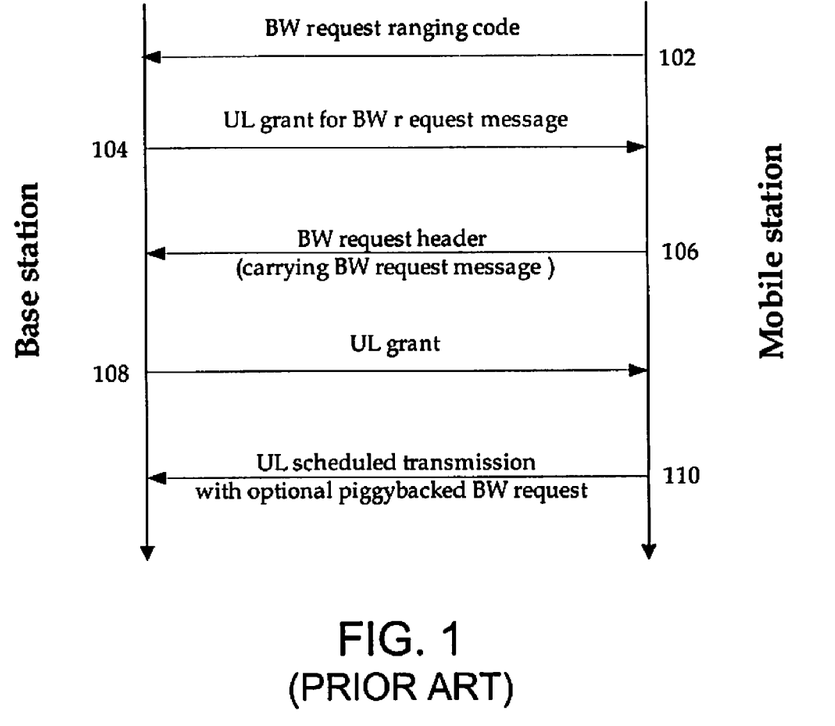
FIG. 1 is a diagram illustrating a five-step BW REQ signaling procedure in an IEEE 802.16e system.

An example of a BW REQ signaling procedure in an IEEE 802.16e system is illustrated in FIG. 1. The procedure begins at step 102, in which the MS randomly selects one of a plurality of BW REQ ranging codes, and transmits the selected ranging code to the BS using the time/frequency/space resource previously allocated to the BW REQ channel or the resource accessible by every MS. In step 104, the BS detects the transmission of the BW REQ ranging code, and determines whether the transmitted BW REQ ranging code is one of the BW REQ ranging codes that are transferable in the BW REQ channel. Upon a positive determination of the BW REQ ranging code, the BS allocates an uplink resource of a pre-defined size to the MS based on a broadcast identifier (ID). The size of the allocated uplink resource is pre-defined between the BS and the MS according to the BW REQ ranging code.

In step 106, when the uplink resource is allocated by the BS in response to the BW REQ ranging code, the MS transmits BW REQ information including a corresponding MS-ID, or alternatively a Connection or Station ID (CID or SID), and a requested uplink resource corresponding to a bandwidth required to deliver the uplink traffic in a BW REQ message. The BW REQ message is transmitted according to a designated format, such as a BW REQ header. Accordingly, it is necessary for the uplink resource allocated in step 104 to have a pre-defined size capable of delivering the designated format.

In step 108, the BS acquires the BW REQ message, including the MS-ID (or the CID or SID) and the requested uplink resource by decoding the BW REQ header. The BS reflects the BW REQ information in an uplink scheduler and grants another uplink resource to the MS in accordance with a size requested by the MS at a point in time permitted by the scheduler.

In step 110, when the uplink resource is granted, the MS transmits the uplink traffic that was stored in a queue of the MS. When additional uplink resources are required, the MS can piggyback BW REQ message to the allocated resource without having to repeat the BW REQ signaling procedure from step 102.

The conventional BW REQ signaling procedure described above requires five steps of signaling between the MS and the BS, and is commonly referred to as the five-step BW REQ signaling procedure. Each signaling step requires encoding/decoding and contention resolution, thereby requiring more than one frame. Thus, it is difficult for the five-step BW REQ signaling procedure to support delay sensitive Real-Time (RT) services, which require transmission as soon as possible after the uplink traffic is generated.

SUMMARY OF THE INVENTION

The present invention has been made to address at least the above problems and/or disadvantages and to provide at least the advantages described below. Accordingly, an aspect of the present invention provides methods and apparatuses for requesting and allocating uplink BW over a BW REQ channel in an OFDMA communication system.

According to one aspect of the present invention, a method is provided for requesting uplink Bandwidth (BW) over a BW Request (REQ) channel in an Orthogonal Frequency Division Multiple Access (OFDMA) communication system. A BW REQ indicator is transmitted with a BW REQ message over the BW REQ channel from a Mobile Station (MS) to a Base Station (BS) to request an uplink resource for uplink traffic of a delay sensitive service. A grant of the requested uplink resource is received from the BS in accordance with the transmitted BW REQ indicator and the BW REQ message. The uplink traffic is transmitted from the MS to the BS using the granted uplink resource.

According to another aspect of the present invention, a method is provided for allocating uplink Bandwidth (BW) over a BW Request (REQ) channel in an Orthogonal Frequency Division Multiple Access (OFDMA) communication system. It is determined whether a BW REQ indicator with a BW REQ message are received at a Base Station (BS) from a Mobile Station (MS) over the BW REQ channel as a request for an uplink resource for uplink traffic of a delay sensitive service. The requested uplink resource is allocated in accordance with the received BW REQ indicator and the BW REQ message. The uplink traffic is received at the BS from the MS using the allocated uplink resource.

According to an additional aspect of the present invention, a Mobile Station (MS) is provided for requesting uplink Bandwidth (BW) over a BW Request (REQ) channel in an Orthogonal Frequency Division Multiple Access (OFDMA) communication system. The MS includes a transmitter for transmitting a BW REQ indicator with a BW REQ message over the BW REQ channel to a Base Station (BS) to request an uplink resource for uplink traffic of a delay sensitive service, and transmitting the uplink traffic to the BS using a granted uplink resource. The MS also includes a receiver for receiving a grant of the requested uplink resource from the BS in accordance with the BW REQ indicator and the BW REQ message.

According to a further aspect of the present invention, a Base Station (BS) is provided for allocating uplink Bandwidth (BW) over a BW Request (REQ) channel in an Orthogonal Frequency Division Multiple Access (OFDMA) communication system. The BS includes receiver for receiving a BW REQ indicator and a BW REQ message from a Mobile Station (MS) over the BW REQ channel as a request for an uplink resource for uplink traffic of a delay sensitive service, and receiving uplink traffic from the MS using an allocated uplink resource. The BS also includes a processor for determining whether the BW REQ indicator with the BW REQ message is properly received from the MS. The BS further includes an allocator for allocating the requested uplink resource in accordance with the BW REQ indicator and the BW REQ message.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustrative purposes only and not for the purpose of limiting the invention, as defined by the appended claims and their equivalents.

It is to be understood that the singular forms "a," "an," and "the" include plural referents unless the context clearly dictates otherwise. Thus, for example, reference to "an identifier" includes reference to one or more of such identifiers.

Figure 2:
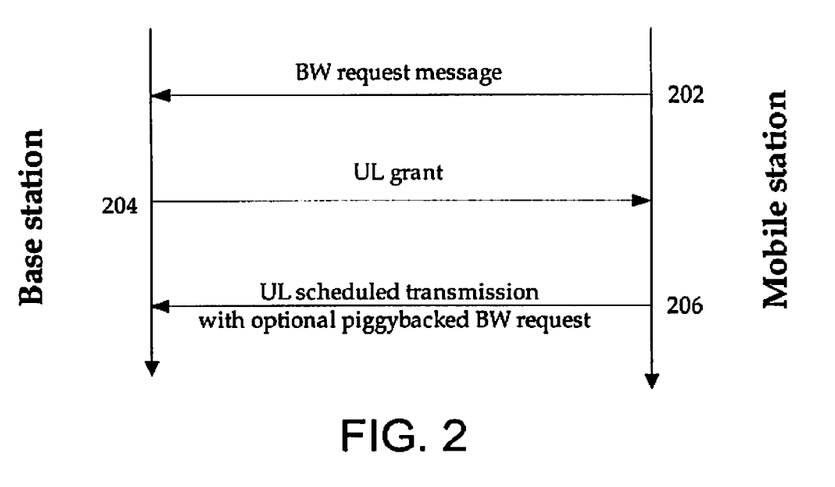
FIG. 2 is a diagram illustrating a three-step BW REQ signaling procedure, according to an embodiment of the present invention.

In order to properly support delay sensitive Real-Time (RT) services, the latency of the five-step BW REQ signaling procedure needs to be reduced. Latency reduction can be achieved through a reduction of the number of steps involved in the BW REQ signaling procedure. FIG. 2 is a diagram illustrating a three-step BW REQ signaling procedure, according to an embodiment of the present invention.

The procedure of FIG. 2 begins at step 202, where the MS transmits at least a portion of the BW REQ information through the BW REQ channel as a BW REQ message using a predefined format. The BW REQ information relates to an MS-ID (or CID or SID), a type of uplink traffic for transmission, and a requested uplink resource relating to bandwidth size.

In step 204, the BS decodes the BW REQ message. When a contention does not occur between BW REQ messages of multiple MSs, the BS acquires the MS-ID (or CID or SID) and the size of the requested uplink resource using information decoded from the BW REQ message. The BS reflects this information in the uplink scheduler and grants an uplink resource in accordance with a size requested by the MS at a point in time permitted by the scheduler. In reflecting the information, the BS transmits information decoded from the BW REQ message to the uplink scheduler. Accordingly, the uplink scheduler grants an uplink resource to the MS.

In step 206, when the uplink resource is granted, the MS transmits uplink traffic that was stored in a queue of the MS. When additional uplink resources are required, the MS can piggyback the BW REQ information to the allocated resource without having to repeat the procedure from step 202.

Compared to the conventional five-step BW REQ signaling procedure, the above-described three-step signaling procedure is more efficient in supporting a delay sensitive RT service. However, the BS in the three-step signaling procedure cannot decode BW REQ messages when multiple MSs concurrently send a BW REQ message. The five-step signaling procedure is capable of processing all BW REQ information of multiple MSs within one BW REQ channel unless the multiple MSs select the same BW REQ ranging code. When employing multiple receive antennas in conjunction with the three-step signaling procedure, the BS is able to decode multiple BW REQ messages using a MIMO channel technique. However, since the maximum number of the decodable messages is limited to the number of receive antennas of the BS, the contention probability still remains greater than the five-step BW REQ signaling procedure and considerably increases decoder complexity in the BS.

Figure 3:
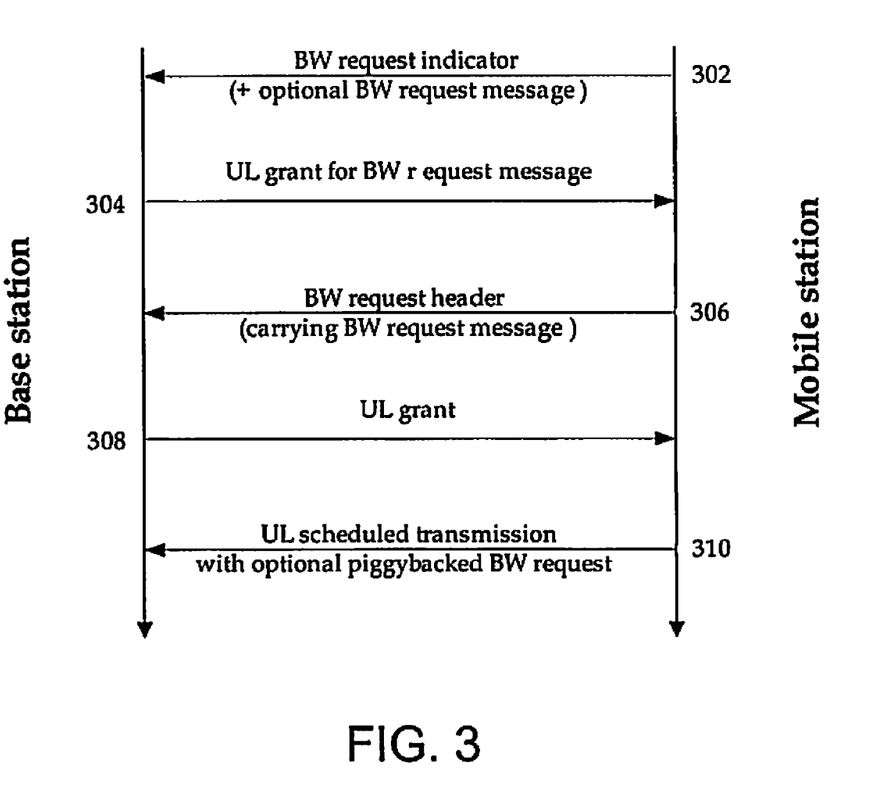
FIG. 3 is a diagram illustrating a combined three-step and five-step BW REQ signaling procedure, according to an embodiment of the present invention.

Referring now to FIG. 3, a diagram illustrates a combined three-step and five-step BW REQ signaling procedure, according to an embodiment of the present invention. The combined signaling procedure provides the advantages of both BW REQ signaling procedures. The contention probability is lowered due to the fact that MSs attempt the three-step BW REQ signaling procedure for delay sensitive services, such as RT services, and attempt the five-step BW REQ signaling procedure for non-delay-sensitive services, such as Non Real-Time (NRT) services. RT services include Voice over Internet Protocol (VoIP) packets, time-urgent packets like streaming video, and an Acknowledgement for Transmission Control Protocol (TCP ACK) in the RT services. Services other than the RT services may be referred to the NRT services, such as Best Effort (BE), for example.

The procedure of FIG. 3 begins at step 302, in which the BW REQ channel is divided into two regions for delivering a BW REQ indicator and a BW REQ message. The MS selects one of the plurality of BW REQ ranging codes and transmits the selected ranging code as the BW REQ indicator. The BW REQ indicator may be referred to as a BW REQ preamble. If the service of the uplink traffic for which the MS is requesting transmission is an RT service, or a service type pre-classified as a delay sensitive service, the BW REQ message is transmitted with the BW REQ indicator in a predefined format. Specifically, at least a portion of information relating to an MS-ID (or Connection or Station ID), a type of uplink traffic for transmission, and a requested uplink resource relating to a size of the bandwidth are transmitted together over the region allocated for the BW REQ message. If the uplink traffic is an NRT service, such as BE, only the BW REQ indicator is transmitted. The BW REQ message may be referred to as a quick access message.

In step 304, the BS detects reception of the BW REQ ranging code transmitted in the BW REQ indicator region of the BW REQ channel, and examines whether the transmitted ranging code is one of the plurality of ranging codes that may be transmitted in the BW REQ channel. When reception of a particular BW REQ ranging code is detected, the BS attempts to decode a corresponding BW REQ message. When the BW REQ ranging code is detected without reception of the BW REQ message, the BS allocates and grants an uplink resource of a pre-defined size for carrying a BW REQ header with respect to the received ranging code and through a broadcast ID. A similar allocation is provided when it is determined that the signal quality of a received BW REQ message is not sufficiently high enough to directly grant uplink traffic through the three-step BW REQ signaling procedure. For example, signal quality may be measured by checking a Cyclic Redundancy Check (CRC).

If both the BW REQ indicator and the BW REQ message are received at the BS and it is determined that the BW REQ message has a sufficiently high signal quality, the BS directly reflects the resource requested by the MS in the BW REQ message in the uplink scheduler, thereby eliminating a need to allocate and grant an uplink resource for the BW REQ header and proceeding from step 302 directly to step 308 in FIG. 3.

If the uplink resource is allocated in step 304 in accordance with the BW REQ ranging code, the MS transmits the BW REQ header having BW REQ message that includes BW REQ information such as the MS-ID (or Connection or Station ID) and the requested uplink resource corresponding to a bandwidth required for the delivery of the uplink traffic, according to a defined format. The BW REQ header may also be generated and transmitted by the MS in situations in which the uplink traffic of the MS is for an RT service and the MS transmits both of the BW REQ indicator and the BW REQ message in step 302, when the BS determines that the signal quality of the BW REQ message is not sufficiently high enough.

In step 308, by decoding the BW REQ header or decoding the BW REQ message, the BS acquires the MS-ID (or CID or SID) and the requested uplink resource. The BS reflects this information in the uplink scheduler and grants an uplink resource having a size requested by the MS at a point in time permitted by the scheduler.

In step 310, when the uplink resource is granted, the MS transmits the uplink traffic that was stored in a queue of the MS. When additional uplink resources are required, the MS can piggyback the BW REQ information to the allocated resource without having to repeat the procedure from step 302.

According to the procedure described above, all five steps are performed when the MS attempts a BW REQ for an NRT service, whereas it is also possible that the requested uplink resource is granted only using steps 302, 308 and 310 when the MS attempts a BW REQ for a delay sensitive service, such as an RT service.

The MS may also attempt the three-step BW REQ signaling procedure regardless of service types. In such an embodiment, after a trial of the three-step BW REQ signaling procedure, the MS performs the five-step BW REQ signaling procedure as a fallback, if the BS fails to decode a BW REQ message.

For the three-step BW REQ signaling procedure, the MS is required to transmit at least the MS-ID and the requested uplink resource (or Quality of Service (QoS) related information) over the BW REQ channel. Specifically, a 12-bit station ID $[s_0, s_1, s_2, s_3, \ldots, s_{10}, s_{11}]$ and a pre-defined BW REQ size of 3-4 bits (or QoS identifier) $[q_0, q_1, q_2, (q_3)]$ are assumed. Herein, the pre-defined BW REO size denotes a value or an index indicating an amount of uplink resource which is negotiated between an MS and a BS when a corresponding call is set. Herein, $s_0$ and $q_0$ denote the Station ID and the first Most Significant Bit (MSB) of the predefined BW REQ size, respectively. The BW REQ size is defined and limited based on the delay sensitive BW REQ type, such as a time-urgent MAC management message, a VoIP packet, Video streaming, and an TCP ACK.

Before mapping the 12-bit Station ID and the pre-defined BW REQ size to the BW REQ channel, the BW REQ information of 15 bits (or 16 bits) are generated. When the BW REQ information is expressed as $[b_0, b_1, b_2, \ldots, b_{13}, b_{14}, (b_{15})]$, it may be generated as shown in Equation (1) below.

$$[b_0, b_1, b_2, \ldots, b_{13}, b_{14}] = [s_0, s_1, s_2, \ldots, s_8, s_9, q_0, q_1, q_2, s_{10}, s_{11}] \quad (1)$$

When the predefined BW REQ size is constituted with 4 bits, the BW REQ information is generated as shown in Equation (2) below.

$$[b_0, b_1, b_2, \ldots, b_{13}, b_{14}, b_{15}] = [s_0, s_1, s_2, \ldots, s_7, s_8, q_0, q_1, q_2, q_3, s_9, s_{10}, S_{11}] \quad (2)$$

When the BW REQ information is generated through a reordering of the Station ID and the predefined BW REQ size, the BW REQ indicator part and the BW REQ message part can be evenly divided in the transmission of the BW REQ channel. Thus, when MSs having the same Least Significant Bit (LSB), Station ID or requested uplink resource attempt a BW REQ at the same time, the contention probability is reduced.

Figure 4:
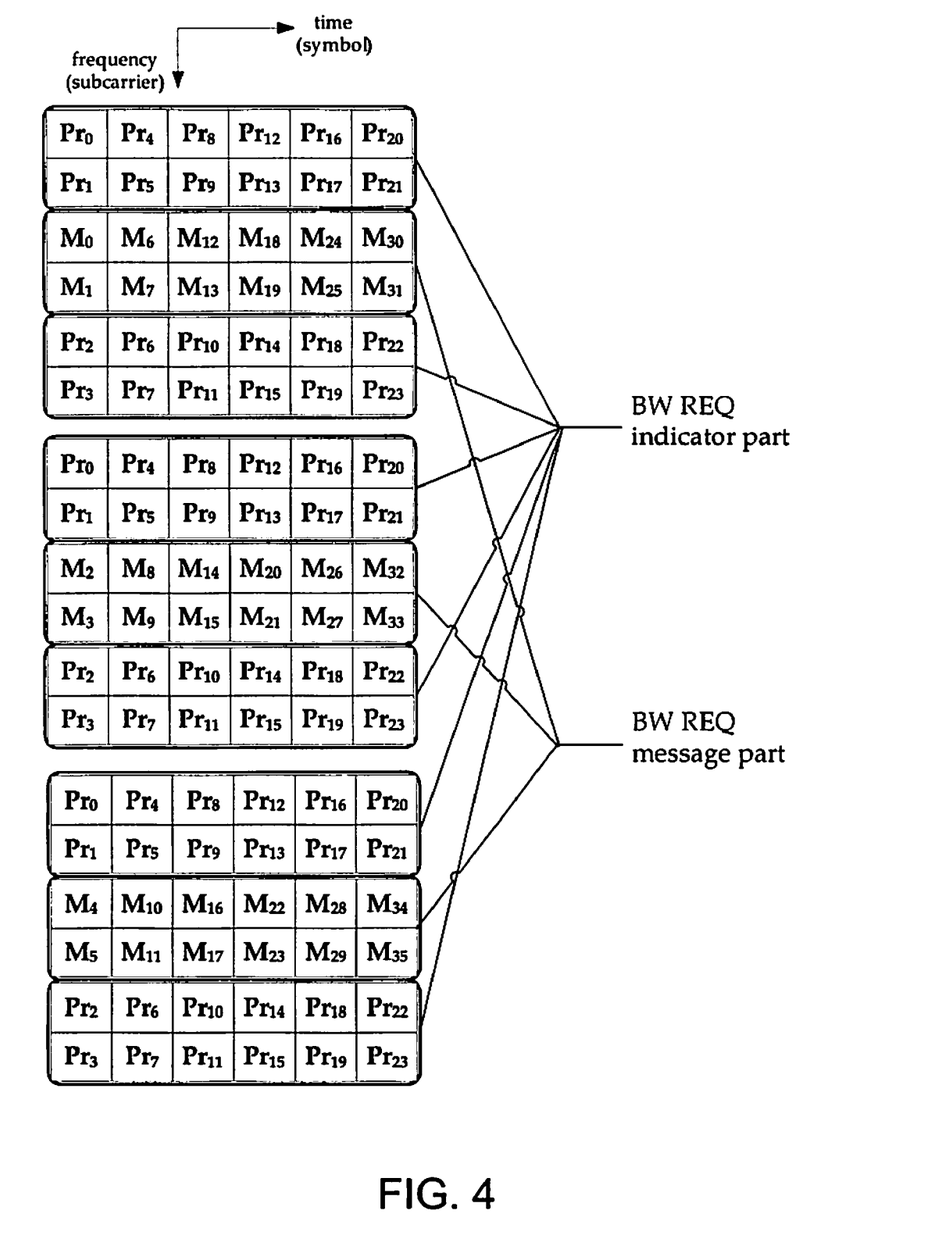
FIG. 4 is a diagram illustrating the physical structure of a BW REQ channel supporting the combined three-step and five-step BW REQ signaling procedure, according to an embodiment of the present invention.

Referring now to FIG. 4, a diagram illustrates the physical structure of a BW REQ channel supporting the combined three-step and five-step BW REQ signaling procedure, according to an embodiment of the present invention. It is to be understood that the following details are for purposes of explanation only, and other variations may be employed without departing from the scope of the present invention.

The BW REQ channel includes three BW REQ tiles that include six adjacent subcarriers of six symbols each. Each BW REQ tile is extracted to be distributed uniformly throughout the whole band for frequency diversity. Each BW REQ tile is subdivided into three subtiles, each of which include two adjacent subcarriers of six symbols. The subtiles at each end of the BW REQ tile are used to carry the BW REQ indicator, while the middle subtile in each BW REQ tile is used to carry the BW REQ message. Thus, character 'M' denotes Message, and character 'Pr' denotes Preamble (or indicator).

In accordance with the physical structure of the BW REQ channel shown in FIG. 4, the BW REQ indicator is determined as one of 24 orthogonal sequence indices (0-23). and the BW REQ message can carry 12-bit BW REQ information bits using Quadrature Phase Shift Keying (QPSK) modulation and channel coding of 1/6 code rate.

A Cyclic Redundancy Check (CRC) may be utilized in order to increase the reliability of the BW REQ message and reduce false message detection, which can cause confusion between the three-step procedure and the five-step procedure.

For 6-bit CRC, a $(x^6+x+1)$ polynomial is used. The BW REQ message may carry 18 bits, which include 12-bit BW REQ information and 6-bit CRC using channel coding of 1/4 code rate.

For 5-bit CRC, a $(x^5+x^4+x^2+1)$ polynomial is used. The BW REQ message may carry 16 bits, which include 11-bit BW REQ information and 5-bit CRC using channel coding of 1/4 code rate.

For 3-bit CRC, a $(x^3+x+1)$ polynomial is used. The BW REQ message may carry 15 bits, which include 12-bit BW REQ information and 3-bit CRC using channel coding of 1/5 code rate.

In one embodiment of the present invention, a mapping method for transmitting the 16-bit BW REQ information bits $[b_0, b_1, b_2, \ldots, b_{13}, b_{14}, b_{15}]$ in the physical structure as shown in FIG. 4 is provided. 12 bits of $[b_0, b_1, b_2, \ldots, b_{10}, b_{11}]$ are carried by the BW REQ message. The last 4 bits $[b_{12}, b_{13}, b_{14}, b_{15}]$ are converted into a decimal number and used to select the orthogonal sequence index of the BW REQ indicator. The BS detects and reassembles the BW REQ indicator and the BW REQ message respectively, and thus reconstructs the BW REQ information bits.

In the above-described embodiment of the present invention, an MS attempting the three-step signaling procedure can only select an orthogonal sequence index between 0 and 15 as the BW REQ indicator due to the limit of 4 bits. Accordingly, the contention probability between MSs attempting the three-step signaling procedure is increased. This limited orthogonal sequence index selection also increases the contention probability due to the fact that the orthogonal sequence index cannot be kept constant with respect to an MS attempting the five-step BW REQ signaling procedure, which selects an orthogonal sequence index between 0 and 23.

Problems may arise in the three-step BW REQ signaling procedure when the BS errs in detecting the BW REQ information, or when the MS attempts the five-step BW REQ signaling procedure, transmits only the BW REQ indicator, and the BS construes the transmission as the three-step BW REQ signaling procedure due to a false alarm detection error in the BW REQ message. When an error occurs, a resource is allocated to an MS that did not yet request an uplink resource. As a result, a decrease in system capacity caused by the waste of the resources may become an issue. In the above-mentioned embodiment of the present invention, when either the BW REQ indicator or the BW REQ message triggers false alarm detection or when the decoding error occurs, system capacity may become reduced.

In another embodiment of the present invention, which solves the problems described above, it is assumed that the BW REQ information has 15 bits in the form of $[b_0, b_1, b_2, \ldots, b_{12}, b_{13}, b_{14}]$. The MSB 12 bits $[b_0, b_1, b_2, \ldots, b_{10}, b_{11}]$ of the BW REQ information bits are carried by the BW REQ message. The orthogonal sequence index of the BW REQ indicator is selected from the LSB 3 bits $[b_{12}, b_{13}, b_{14}]$ and the MSB of the BW REQ information bits in accordance with Equation (3) below.

$$\text{orthogonal sequence index} = \text{dec}([b_{12}b_{13}b_{14}]) + 8*\text{mod}(\text{dec}([b_{12}b_{13}b_{14}]) + \text{dec}([b_0b_1b_2]), 3) \quad (3)$$

Here, dec([ ]) denotes the conversion of a binary number to a decimal number, and mod(A, B) denotes a remainder of a division of A by B. When the last term $\text{dec}([b_0b_1b_2])$ in the above equation is replaced by an arbitrary 3 bits of the BW REQ information bits carried by the BW REQ message, the effect of the equation can be sustained.

The BS detects the BW REQ indicator and the BW REQ message respectively. If the BW REQ message includes the CRC, the BS checks whether the CRC from BW REQ information bits matches the received CRC. Based on the detected BW REQ indicator and BW REQ message, the BS determines whether the mapping relation of Equation (3) matches.

When the CRC or the mapping relation is not matched, the BS determines that the decoding of the BW REQ message is not sufficiently reliable or that the five-step BW REQ signaling procedure is attempted and the BW REQ message was not transmitted at all, and the BS proceeds to step 304 of FIG. 3. When the mapping relation is satisfied, the BS reconstructs the BW REQ information bits and proceeds to step 308 of FIG. 3 according to the three-step BW REQ signaling procedure.

In an additional embodiment of the present invention, 16-bit BW REQ information bits are in the form of $[b_0, b_1, b_2, \ldots, b_{12}, b_{13}, b_{14}, b_{15}]$. While the steps are substantially identical to the immediately preceding embodiment, Equation (3) can be substituted with Equation (4) below.

$$\text{orthogonal sequence index} = \text{dec}([b_{12}b_{13}b_{14}b_{15}]) + 8*\text{mod}(\text{dec}([b_{12}b_{13}b_{14}b_{15}]) - \text{dec}([b_0b_1b_2b_3]), 3) \quad (4)$$

When the last term $\text{dec}([b_0b_1b_2b_3])$ in the above equation is replaced by an arbitrary 4 bits of the BW REQ information bits carried by the BW REQ message, the same effect can be sustained.

In a further embodiment of the present invention, 15-bit BW REQ information bits are in the form of $[b_0, b_1, b_2, \ldots, b_{12}, b_{13}, b_{14}]$. While the steps are substantially identical to the two immediately preceding embodiments, Equation (3) can be substituted with Equation (5) below.

$$\text{orthogonal sequence index} = \text{dec}([b_{12}b_{13}b_{14}]) + 8*\text{mod}(\text{dec}([b_{12}b_{13}b_{14}]) + \text{dec}([p_0p_1p_2]), 3) \quad (5)$$

$p_0, p_1, p_2$ are defined based on Equation (6) below.

$$p_0 = \text{mod}(b_0 + b_1 + b_2 + b_3, 2),$$

$$p_1 = \text{mod}(b_4 + b_5 + b_6 + b_7, 2),$$

$$p_2 = \text{mod}(b_8 + b_9 + b_{10} + b_{11}, 2), \quad (6)$$

In yet another embodiment of the present invention, another mapping rule is provided for 15-bit BW REQ information bits in the form of $[b_0, b_1, b_2, \ldots, b_{12}, b_{13}, b_{14}]$. While the steps are substantially identical to the above embodiments, Equation (3) can be substituted with Equation (7) below.

$$\text{Orthogonal sequence index} = \text{dec}(b_{12}b_{13}b_{14}) + 8*\text{mod}\left(\sum_{i=0}^{K} \text{dec}(b_{3i}b_{3i+1}b_{3i+2}), 3\right) \quad (7)$$

In Equation (7), the range of K is from 0 to 4. When K=0, Equation (7) is equal to Equation (3). When K=4, Equation (7) is equal to Equation (5). i is an integer.

In yet a further embodiment of the present invention, another mapping rule is provided for M-bit BW REQ information bits in the form of $[b_0, b_1, b_2, \ldots, b_{M+1}]$. While the steps are substantially identical to the above embodiments, Equation (3) can be substituted with Equation (8) below.

$$\text{Orthogonal sequence index} = \text{mod}\left\{\begin{array}{l} f(t, b_0, b_1, \ldots, b_{M-1}) - \\ \text{dec}(b_{M-3}b_{M-2}b_{M-1}) \\ -8*\text{mod}\left(\sum_{i=0}^{K} r_i, 3\right) \end{array}, 24\right\} \quad (8)$$

In Equation (8), $r_i$ is $\text{dec}(b_{3i}b_{3i+1}b_{3i+2})$, t is a superframe index or a frame index, and $f(t, b_0, b_1, \ldots, b_{M+1})$ is a function related to t and $b_0, b_1, \ldots, b_{M+1}$. $f(t, b_0, b_1, \ldots, b_{M+1})$ enables two MSs to reselect different sequences when the MSs fail to gain access to the three-step signaling procedure and the five-step signaling procedure by selecting the same orthogonal sequence index. For example, $f(t, b_0, b_1, \ldots, b_{M+1})$ can be expressed as $t^* \lfloor dec(b_0 b_1 b_2 \ldots b_{L-1})/24 \rfloor$. Variable L is less than or equal to variable M (L<=M). $f(t, b_0, b_1, \ldots, b_{M+1})$ can be expressed in numerous ways to allow different MSs to select different orthogonal sequence indices at every frame or superframe.

In an additional embodiment of the present invention, another mapping rule is provided for M-bit BW REQ information bits in the form of $[b_0, b_1, b_2, \ldots, b_{M+1}]$. While the steps are substantially identical to the above embodiments, Equation (3) can be substituted with Equation (9) below.

$$\text{Orthogonal sequence index} = \text{mod} \left\{ \begin{array}{l} f(t, r_0, r_1, \ldots, r_K) - \\ dec(b_{M-3} b_{M-2} b_{M-1}) \\ -8 * \text{mod}\left(\sum_{i=0}^{K} r_i, 3\right), \end{array} 24 \right\} \quad (9)$$

In Equation (9), $r_i$ is $dec(b_{3i} b_{3i+1} b_{3i+2})$, t is a superframe index or a frame index, and $f(t, r_0, r_1, \ldots, r_K)$ is a function related to t and $r_0, r_1, \ldots, r_K$. $f(t, r_0, r_1, \ldots, r_K)$ is a function that enables two MSs to reselect different sequences at a next time when they fail to gain access to the three-step signaling procedure and the five-step signaling procedure due to fact that they selected the same orthogonal sequence index. For example, $f(t, r_0, r_1, \ldots, r_K)$ can be expressed as mod $\{t^* (2^{3K} r_0 + 2^{3K-3} r_1 + \ldots + 2^0 r_K), 24\}$ or mod $\{t^*(r_0 + r_1 + \ldots + r_K), 24\}$. $f(t, r_0, r_1, \ldots, r_K)$ can be expressed in numerous ways to allow the different MSs to select different orthogonal sequence indices at every frame or superframe.

Figure 5:
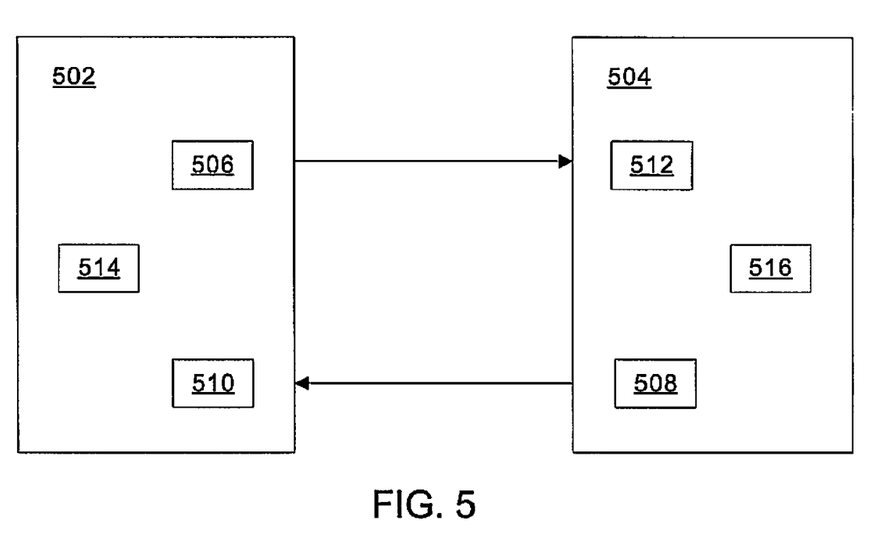
FIG. 5 is a diagram illustrating an MS and a BS in a wireless communication system, according to an embodiment of the present invention.

Referring now to FIG. 5, a diagram illustrates an MS and a BS in a wireless communication system, according to an embodiment of the present invention. Both an MS 502 and a BS 504 are shown, each of which include respective transmitters 506, 508, receivers 510, 512, and processors 514, 516.

As set forth above, the present invention provides a method for reducing the latency of the BW REQ signaling procedure from five steps to three steps in the OFDMA communication system. By virtue of the suggested orthogonal sequence index selection method of the BW REQ indicator, the influence of a decoding error of the BW REQ message or an error of the false alarm detection can be mitigated. Therefore, transmission and reception performance of the BW REQ channel can be enhanced and waste of the system capacity, which is caused by the error, can be avoided.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for requesting uplink Bandwidth (BW) over a BW Request (REQ) channel in an Orthogonal Frequency Division Multiple Access (OFDMA) communication system, comprising the steps of:
    generating BW REQ information comprising a Mobile Station-Identifier (MS-ID) and requested uplink resource information;
    determining a sequence index of a BW REQ indicator, in which at least one bit of the BW REQ information is carried using the sequence index, according to a mapping relation between a frame number and the BW REQ information;
    generating a BW REQ message comprising remaining bits of the BW REQ information; and
    transmitting the BW REQ indicator over a first region of the BW REQ channel and the BW REQ message over a second region of the BW REQ channel to a Base Station (BS).

2. The method of claim 1, wherein the requested uplink resource information comprises one of a pre-defined BW REQ size and a Quality of Service (QoS) identifier.

3. The method of claim 1, wherein the BW REQ indicator is selected from one of a plurality of BW ranging codes, and wherein the BW REQ message comprises all or a part of the BW REQ information.

4. The method of claim 1, wherein the BW REQ channel is divided into the first region for the BW REQ indicator and the second region for the BW REQ message,
    wherein the BW REQ channel comprises three (3) BW REQ tiles, wherein each tile comprises three (3) subtiles, and each subtile comprises two (2) adjacent subcarriers having six (6) symbols each, and
    wherein end subtiles of each tile define the BW REQ indicator, and a middle subtile of each tile defines the BW REQ message.

5. The method of claim 1, wherein a part of bits of the BW REQ information are carried by the BW REQ message and an orthogonal sequence index of the BW REQ indicator is selected in accordance with a mapping relation defined by at least the remaining bits of the BW REQ information.

6. The method of claim 1, wherein the mapping relation between the BW REQ message and the BW REQ indicator is checked by the BS to determine if the BW REQ message is sufficiently reliable before the grant of the uplink resource is transmitted to the MS.

7. The method of claim 1, wherein the BW REQ message comprises $[b_0, b_1, b_2, \ldots, b_{M-1}]$ bits, and an orthogonal sequence index of the BW REQ indicator is selected in accordance with:

$$\text{Orthogonal sequence index} = \text{mod} \left\{ \begin{array}{l} f(t, b_0, b_1, \ldots, b_{M-1}) + \\ dec(b_{M-3} b_{M-2} b_{M-1}) \\ -8 * \text{mod}\left(\sum_{i=0}^{K} r_i, 3\right), \end{array} 24 \right\}$$

where $r_i$ is $dec(b_{3i} b_{3i+1} b_{3i+2})$, t is a superframe index or a frame index, and $f(t, b_0, b_1, \ldots, b_{M-1})$ is function related to t and $b_0, b_1, \ldots, b_{M-1}$.

8. The method of claim 7, wherein $f(t, b_0, b_1, \ldots, b_{M-1})$ is a function expressed as $t^* \lfloor dec(b_0 b_1 b_2 \ldots b_{L-1})/24 \rfloor$, where variable L is less than or equal to variable M (L≦M).

9. The method of claim 1, wherein the mapping relation between the BW REQ message and the BW REQ indicator is defined a function that uses bits of the BW REQ information, and one of a frame index and a superframe index as input parameters.

10. The method of claim 1, further comprising:
    receiving a grant of a requested uplink resource from the BS in accordance with the transmitted BW REQ indicator and the BW REQ message; and
    transmitting uplink traffic from an MS to the BS using the granted uplink resource.

11. A method for allocating uplink Bandwidth (BW) over a BW Request (REQ) channel in an Orthogonal Frequency Division Multiple Access (OFDMA) communication system comprising the steps of:
   determining whether a BW REQ indicator is received at a Base Station (BS) from a Mobile Station (MS) over a first region of the BW REQ channel;
   determining a BW REQ message corresponding the BW REQ indicator is received at the BS from the MS over a second region of the BW REQ channel; and
   generating BW REQ information having at least one of a Mobile Station-Identifier (MS-ID) and a requested uplink resource information by using the BW REQ indicator, in which at least one bit of the BW REQ information is carried using an index, according to a mapping relation between a frame number and the BW REQ information and the BW REQ message comprising remaining bits of the BW REQ information.

12. The method of claim 11, wherein the requested uplink resource information comprises one of a pre-defined BW REQ size and a Quality of Service (QoS) identifier.

13. The method of claim 11, wherein the BW REQ indicator is selected from one of a plurality of BW ranging codes, and
   wherein the BW REQ message comprises all or a part of the BW REQ information.

14. The method of claim 11, wherein the BW REQ channel is divided into the first region for the BW REQ indicator and the second region for the BW REQ message,
   wherein the BW REQ channel comprises three (3) BW REQ tiles, wherein each tile comprises three (3) subtiles, and each subtile comprises two (2) adjacent subcarriers having six (6) symbols each, and
   wherein end subtiles of each tile define the BW REQ indicator, and a middle subtile of each tile defines the BW REQ message.

15. The method of claim 11, wherein a part of bits of the BW REQ information are carried by the BW REQ message and an orthogonal sequence index of the BW REQ indicator is selected in accordance with a mapping relation defined by at least the remaining bits of the BW REQ information.

16. The method of claim 11, wherein the mapping relation between the BW REQ message and the BW REQ indicator is checked by the BS to determine if the BW REQ message is sufficiently reliable before the grant of the uplink resource is transmitted to the MS.

17. The method of claim 11, wherein the BW REQ message comprises $[b_0, b_1, b_2, \ldots, b_{M-1}]$ bits, and an orthogonal sequence index of the BW REQ indicator is selected in accordance with:

$$\text{Orthogonal sequence index} = \mod\left\{ \begin{array}{l} f(t, b_0, b_1, \ldots, b_{M-1}) + \\ dec(b_{M-3}b_{M-2}b_{M-1}) \\ +8*\mod\left(\sum_{i=0}^{K} r_i, 3\right), \end{array} 24 \right\}$$

where $r_i$ is $dec(b_{3i}b_{3i+1}b_{3i+2})$, t is a superframe index or a frame index, and $f(t, b_0, b_1, \ldots, b_{M-1})$ is function related to t and $b_0, b_1, \ldots, b_{M-1}$.

18. The method of claim 17, wherein $f(t, b_0, b_1, \ldots, b_{M-1})$ is a function expressed as $t*\lfloor dec(b_0b_1b_2\ldots b_{L-1})/24 \rfloor$, where variable L is less than or equal to variable M ($L \leq M$).

19. The method of claim 11, wherein, in determining receiving the BW REQ message, the BS checks relationship between the BW REQ message and the BW REQ indicator by determining if the BW REQ message is sufficiently reliable.

20. The method of claim 16, wherein the BS checks a Cyclic Redundancy Check (CRC) in order to determine the reliability of the BW REQ message.

21. The method of claim 11, wherein, in allocating a second uplink resource, the BS reflects an MS identifier and the requested uplink resource in an uplink scheduler.

22. The method of claim 11, wherein the mapping relation between the BW REQ message and the BW REQ indicator is defined a function that uses bits of the BW REQ information, and one of a frame index and a superframe index as input parameters.

23. The method of claim 19, wherein, in determining receiving the BW REQ message, the BS determines whether a signal quality is greater that a threshold in the second region for the BW REQ message.

24. The method of claim 11, further comprising:
   allocating a requested uplink resource in accordance with the BW REQ information; and
   receiving uplink traffic at the BS from the MS using the allocated uplink resource.

25. A Mobile Station (MS) for requesting uplink Bandwidth (BW) over a BW Request (REQ) channel in an Orthogonal Frequency Division Multiple Access (OFDMA) communication system comprising:
   a processor for generating BW REQ information comprising a Mobile Station-Identifier (MS-ID) and requested uplink resource information, for determining a sequence index of a BW REQ indicator, in which at least one bit of the BW REQ information is carried using the sequence index, according to a mapping relation between a frame number and the BW REQ information, and for generating a BW REQ message comprising remaining bits of the BW REQ information; and
   a transmitter for transmitting the BW REQ indicator over a first region of the BW REQ channel and the BW REQ message over a second region of the BW REQ channel to a Base Station (BS).

26. The apparatus of claim 25, further comprising:
   a receiver for receiving a grant of a requested uplink resource from the BS in accordance with the BW REQ indicator and the BW REQ message.

27. A Base Station for allocating uplink Bandwidth (BW) over a BW Request (REQ) channel in an Orthogonal Frequency Division Multiple Access (OFDMA) communication system comprising:
   a receiver for receiving a BW REQ indicator over a first region of the BW REQ channel and a BW REQ message over a second region of the BW REQ channel from a Mobile Station (MS), and receiving uplink traffic from the MS using an allocated uplink resource; and
   a processor for generating BW REQ information having at least one of a Mobile Station-Identifier (MS-ID) and requested uplink resource information by using the BW REQ indicator, in which at least one bit of the BW REQ information is carried using an index, according to a mapping relation between a frame number and the BW REQ information and the BW REQ message comprising remaining bits of the BW REQ information.

28. The apparatus of claim 27, further comprising:
   an allocator for allocating a requested uplink resource in accordance with the BW REQ information, and
   wherein the receiver receives the uplink traffic at the BS from the MS using the allocated uplink resource.

* * * * *